July 10, 1934.  F. SCHRÖTER ET AL  1,965,752
DEVICE FOR THE TRANSMISSION OF PICTURES OR OF TELEGRAPHIC SIGNALS
Filed Nov. 7, 1929
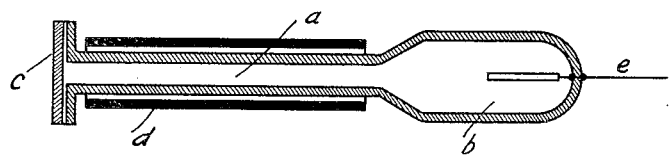
Fig. 1
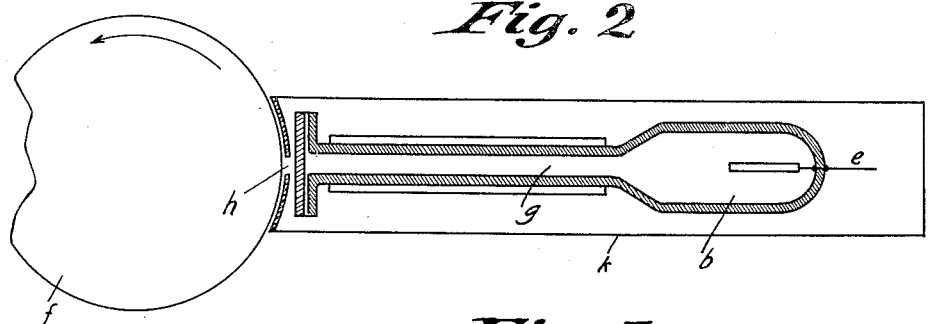
Fig. 2
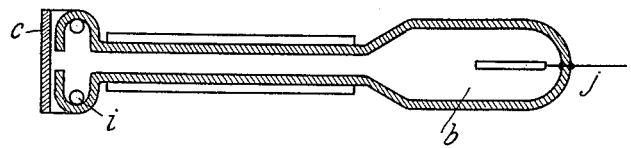
Fig. 3₁
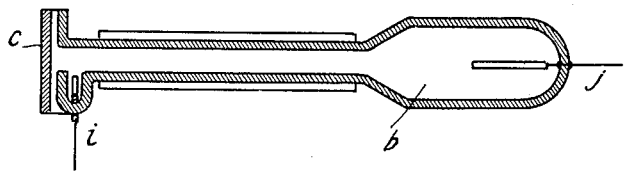
Fig. 3₂
INVENTORS
FRITZ SCHRÖTER AND
BY FRITZ MICHELSSEN
ATTORNEY Patented July 10, 1934

1,965,752

UNITED STATES PATENT OFFICE 1,965,752

DEVICE FOR THE TRANSMISSION OF PICTURES OR OF TELEGRAPHIC SIGNALS

Fritz Schröter and Fritz Michelssen, Berlin, Germany, assignors to Telefunken Gesellschaft fur Drahtlose Telegraphie m. b. H., Berlin, Germany, a corporation of Germany Application November 7, 1929, Serial No. 405,333
In Germany November 26, 1928

5 Claims. (Cl. 176—122)

The present invention is concerned with a new device for the recording of pictures or of telegraphic signs by the aid of light. To attain this aim the invention provides a device of great simplicity and high light intensity in the shape of a capillary tube. The recording luminous point encompassed by a diaphragm is located in the longitudinal axis of the capillary tube. No image producing optical means are required between the luminous source and the diaphragm or between the diaphragm and the recording surface.

Therefore, some of the primary objects of our invention are to provide a system of illumination for picture surfaces or the like in which increased efficiency in reproduction is obtained; a system which is relatively simple in its construction and arrangement of parts; as well as a system which is compact, conveniently operated and easily installed.

The accompanying drawing shows by way of example several embodiments of our invention, wherein:

Fig. 1 illustrates a preferred type of illumination system;

Fig. 2 illustrates the illumination system of Fig. 1, for example, as combined with a recording drum for facsimile work;

Fig. $3_1$ shows a modification of the arrangement of the lamp of Fig. 1; and,

Fig. $3_2$ illustrates still a further modification.

The lamp consists of a capillary tube $a$ and a gas container $b$ blown in one piece with the tube. The other end of the capillary tube is closed by an optically faultless, plane-parallel plate $c$, which may be fastened either by means of a vacuum-holding putty or fused unto the tube. Electric current is supplied by way of the electrodes $d$ and $e$. The electrode $d$ may be regarded as a cylindric wrapping or coat of the capillary tube. When this vessel is filled with suitable gases, for instance, neon-helium or argon-nitrogen of "optical gas pressure", the introduction of electrical oscillations will cause an intense luminescence within the capillary tube. A luminous point, the magnitude of which is determined by the diameter of the capillary tube, is thus obtained in the direction of the tube axis. The intensity of the luminous point may be controlled by modulating the electrical oscillations in rhythm with the picture frequency.

This glow-discharge lamp is made use of, according to this invention, for the production of luminescent pictures, for instance, by way of blackening the photographic papers or films which are passed in front of the lamp, or for the production of television pictures, in which case the luminescence of the capillary tube is utilized in the direction of its longitudinal axis resulting in a high intensity of the luminous point. This device has the advantage over other picture receiving devices or recording apparatus in that the light may act without any auxiliary optical means directly on the sensitized coat, eventually optionally with the interposition of a suitable diaphragm or shutter.

A conventional showing of one manner of use of the glow lamp is shown by Fig. 2, wherein it is assumed that the photographic paper for recording the variations in light is mounted on a rotating drum $f$, but the invention is naturally applicable to other methods of moving the paper. The diaphragm $h$ is placed in the immediate proximity of the drum; then follows the glow-discharge lamp $g$ which obviously must be enclosed in a light-tight case $k$ so that no light could act upon the recording surface of the photographic paper except through the diaphragm.

It is also feasible to have the glow-discharge lamps made in different shapes. With this arrangement the external electrode is used only to initiate the glow-discharge by means of electric oscillations. The actual current for the generation of the picture glow-light within the capillary tube is supplied by way of the electrodes $i$ and $j$; one of these electrodes ($i$) may have, for example, the shape of a ring or of a punctured sheet, as shown by Fig. $3_1$. However, according to Fig. $3_2$, the annular shape may be dispensed with and the current introduced over an electrode located in a one-sided extension. The concentration of the light in one point in the direction of the axis is safeguarded by the capillary tube and by the diaphragm of the recording apparatus.

Having thus described our invention, it is readily recognizable that certain modifications and changes may be made therein, and we believe ourselves entitled to make any and all of these modifications as would readily suggest themselves to those skilled in the art to which the invention relates in so far as such modifications and changes fall fairly within the spirit and scope of the hereinafter appended claims, wherein we claim:

1. A glow discharge device comprising a capillary tube, a first electrode supported within one end of said tube and a tubular second electrode external to said tube and surrounding said tube for a substantial portion of its length, whereby upon application of electric potential between said electrodes a glow discharge is initiated within said tube.

2. A glow discharge device comprising a capillary tube, a first electrode supported within one end of said tube, a second tubular electrode external to said tube and surrounding and housing said tube for a substantial portion of its length, whereby upon application of electric potentials between said electrodes a glow discharge is initiated within said tube, and a window in the end of said tube opposite said first electrode for permitting observation of said glow discharge.

3. A glow discharge device comprising a capillary tube, a first electrode supported within one end of said tube, a second electrode external to said tube and enclosing said tube for a substantial portion of its length, whereby upon application of electric potentials between said first and second electrodes a glow discharge is initiated, and a third electrode contained within the capillary tube for controlling the intensity of said glow discharge.

4. A glow discharge device comprising a capillary tube, a first electrode supported within one end of said tube, a second electrode supported within the opposite end of said tube, and a third tubular electrode external to said tube and enclosing said tube for a substantial portion of its length.

5. A glow discharge device comprising a capillary tube, a first electrode supported within one end of said tube, a second electrode of ring-like shape supported within the opposite end of said tube, and a third tubular electrode external to the said tube and enclosing the tube for a substantial portion of its length.

FRITZ SCHRÖTER.
FRITZ MICHELSSEN.